(12) United States Patent
Kondareddy

(10) Patent No.: US 10,904,894 B2
(45) Date of Patent: *Jan. 26, 2021

(54) DEVICES, SYSTEMS AND METHODS FOR INCREASING DATA THROUGHPUT IN WIRELESS DEVICE WITH SHARED MEDIUM

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,747

(22) Filed: Oct. 23, 2019

(65) Prior Publication Data

US 2020/0112968 A1  Apr. 9, 2020

Related U.S. Application Data

(63) Continuation of application No. 16/214,467, filed on Dec. 10, 2018, now Pat. No. 10,499,407.

(Continued)

(51) Int. Cl.
*H04W 72/08* (2009.01)
*H04W 72/04* (2009.01)
(Continued)

(52) U.S. Cl.
CPC ......... *H04W 72/087* (2013.01); *H04W 16/14* (2013.01); *H04W 72/0406* (2013.01);
(Continued)

(58) Field of Classification Search
None
See application file for complete search history.

(56) References Cited

U.S. PATENT DOCUMENTS 8,086,213 B1  12/2011  Wong et al.
8,848,676 B1   9/2014  Wheeler et al.
(Continued)

FOREIGN PATENT DOCUMENTS

WO   2007008981 A1   1/2007

OTHER PUBLICATIONS

International Search Report for International Application No. PCT/US2019/047056 dated Sep. 9, 2019, 2 pages.
(Continued)

*Primary Examiner* — Michael J Moore, Jr.

(57) ABSTRACT

An example system and method monitor a wireless transmission medium for packets of a first protocol type with first communication circuits of a device while yielding the medium for communications of a second protocol type by second communication circuits of the device. Responsive to the first communication circuits detecting a packet of the first protocol type while the medium is yielded to the second communication circuits, the system and method requests access to the medium for the first communication circuits and in response to granted access to the medium, uses the first communication circuits to execute a data transmission operation according to the first protocol. Responsive to completing the data transmission operation by the first communication circuits the system and method yield the medium back to the second communication circuits.

20 Claims, 7 Drawing Sheets

Related U.S. Application Data

(60) Provisional application No. 62/741,430, filed on Oct. 4, 2018.

(51) Int. Cl.
  *H04W 72/12* (2009.01)
  *H04W 16/14* (2009.01)
  *H04W 4/80* (2018.01)
  *H04W 84/12* (2009.01)
  *H04W 88/06* (2009.01)

(52) U.S. Cl.
  CPC .......... *H04W 72/1215* (2013.01); *H04W 4/80* (2018.02); *H04W 84/12* (2013.01); *H04W 88/06* (2013.01)

(56) References Cited

U.S. PATENT DOCUMENTS

| | | | |
|---|---|---|---|
| 9,002,282 | B1 | 4/2015 | Broise et al. |
| 10,499,407 | B1 * | 12/2019 | Kondareddy ......... H04W 16/14 |
| 2002/0136184 | A1 | 9/2002 | Liang et al. |
| 2008/0139212 | A1 | 6/2008 | Chen et al. |
| 2008/0192806 | A1 | 8/2008 | Wyper et al. |
| 2009/0063740 | A1 | 3/2009 | Yeh et al. |
| 2009/0137206 | A1 | 5/2009 | Sherman et al. |
| 2009/0257379 | A1 | 10/2009 | Robinson et al. |
| 2009/0285167 | A1 | 11/2009 | Hirsch et al. |
| 2010/0061326 | A1 | 3/2010 | Lee et al. |
| 2011/0268024 | A1 | 11/2011 | Jamp et al. |
| 2012/0020348 | A1 | 1/2012 | Haverinen et al. |
| 2013/0155931 | A1 | 6/2013 | Prajapati et al. |
| 2015/0111610 | A1 | 4/2015 | Hwang et al. |
| 2017/0094677 | A1 | 3/2017 | Liu et al. |
| 2018/0084558 | A1 | 3/2018 | Chen et al. |
| 2019/0174418 | A1 | 6/2019 | Kencharla et al. |

OTHER PUBLICATIONS

USPTO Non-Final Rejection for U.S. Appl. No. 16/214,467 dated Mar. 5, 2019, 18 pages.
USPTO Notice of Allowance for U.S. Appl. No. 16/214,467 dated Aug. 7, 2019, 26 pages.
Written Opinion of the International Searching Authority for International Application No. PCT/US2019/047056 dated Sep. 9, 2019, 8 pages.

* cited by examiner

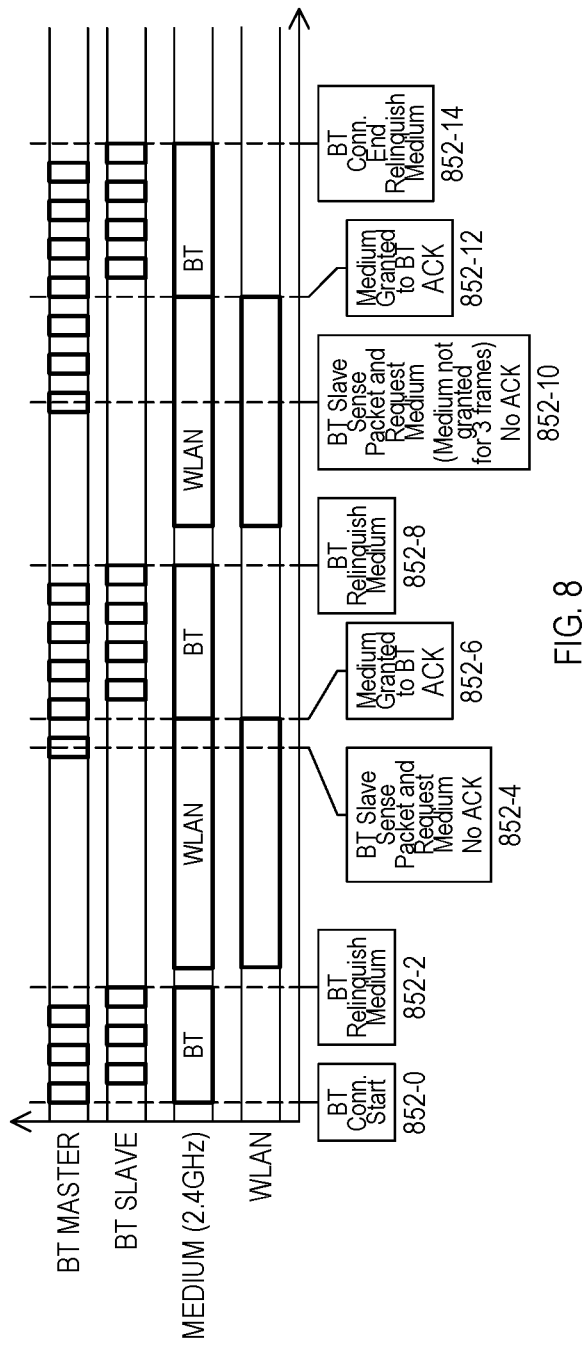
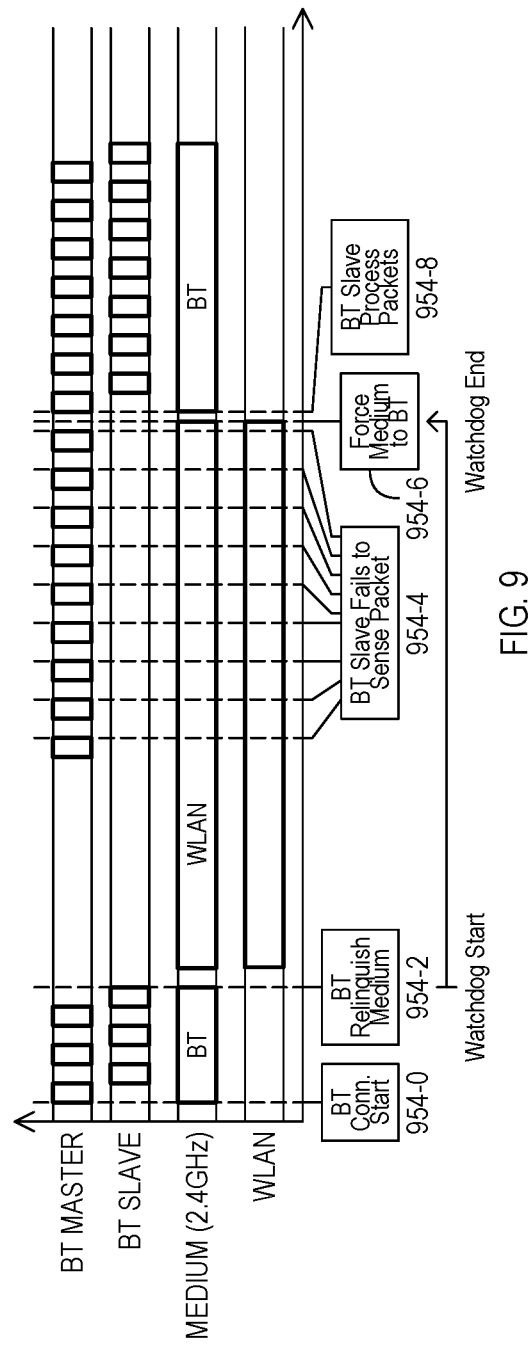
FIG. 8
FIG. 9

(BACKGROUND)

(BACKGROUND)

DEVICES, SYSTEMS AND METHODS FOR INCREASING DATA THROUGHPUT IN WIRELESS DEVICE WITH SHARED MEDIUM

This application is a continuation of U.S. patent application Ser. No. 16/214,467, filed on Dec. 10, 2018, which claims the benefit of U.S. provisional patent application having Ser. No. 62/741,430, filed on Oct. 4, 2018, the contents of which are incorporated by reference herein.

TECHNICAL FIELD

The present disclosure relates generally to wireless devices that share a medium between two different protocols, and more particularly to increasing a data throughput for such devices.

BACKGROUND

Conventional devices that share a medium between two different protocols can include combination (e.g., collocated) devices that provide Bluetooth (BT) and WLAN (e.g., various IEEE 802.11 wireless standards) communications. BT and WLAN can share a medium (i.e., 2.4 GHz band) by alternating access to the medium. BT communications include synchronous modes and asynchronous modes. For synchronous BT communications, a BT slave device can determine when BT communications with another BT device will take place and can coordinate with WLAN communications accordingly. This is not the case for some asynchronous BT communications.

In some asynchronous BT communication modes, a BT slave device cannot predict when data will be transmitted from another BT device, and so the slave device will retain control of the medium to ensure it can detect incoming data packets. As a result, WLAN communications are deferred until BT data transfers can be completed, which can greatly reduce WLAN data throughput. Such asynchronous BT communications can include those employed in the BT advanced audio distribution profile (A2DP) and asynchronous connectionless communications links (ACL), as but two examples.

FIG. 12 shows a conventional method 1200 according to an embodiment. A BT slave device can be in an asynchronous mode of operation 1203. In such a mode, the BT circuits do not know when data transmission operations will occur from another device. As a result, the BT circuits can have control the medium 1205. This prevents a collocated WLAN circuit from transmitting on the medium. The BT circuits monitor the medium to detect a packet 1207. Such an action can include monitoring each frame for an expected packet. If the packet is not received (N from 1207), the BT circuits can continue to monitor in the next frame 1209. Once a packet is detected (Y from 1207), the BT circuits can send an acknowledgement (ACK) in the slave portion of the same frame. Packets are then received and processed 1213. Such an action includes a slave device receiving one or more additional packets in subsequent frames. Once the packets cease, BT can determine if a connection has ended 1215. If a connection has not ended (N from 1215), it is assumed that more asynchronous data is expected. Thus, BT circuits can return to examining frames for packets (1209). If a connection is ended (Y from 1215), the BT circuits can relinquish the medium 1217, enabling WLAN circuits to transmit on the medium.

FIG. 13 is a timing diagram showing how a device having collocated BT circuits and WLAN circuits can limit WLAN throughput when BT circuits are handling asynchronous data transmissions. FIG. 13 shows activity of a BT master, a BT slave, a WLAN circuit, as well as medium shared between BT slave and WLAN circuit. It is understood that BT slave and WLAN circuit are formed in a same device, and a BT master is a different device that can wirelessly transmit packets for reception by the BT slave.

At 1319-1, the BT master can start a connection with the BT slave. At this time there is no contention for the medium by WLAN, so the medium is controlled by the BT slave. At 1319-3, a master can stop sending data, but a connection is not ended (e.g., more data is expected). As a result, a BT slave can maintain control over the medium, waiting to receive more data from BT master, and thus preventing WLAN from transmitting on the medium.

At 1319-5, because the BT slave controls the medium, WLAN can request access to the medium, but is denied.

At 1319-7, a master can resume transmitting data. Because BT slave has control of the media, it can immediately acknowledge such data packets and data transmissions can resume. At 1319-9, data from a master stops, but the connection is not ended. Thus, a BT slave can maintain control over the medium as it waits for more data from the BT master.

At 1319-11, WLAN can again request access to the medium, but be denied.

At 1319-13, a master can resume transmitting data. At 1319-15 data from a master stops and the connection can end. The BT slave can relinquish control of the medium, and at 1319-17 WLAN can access the medium.

It would be desirable to arrive at some way of improving data throughput in combination devices, including but not limited to, combination BT—WLAN devices.

BRIEF DESCRIPTION OF THE DRAWINGS

FIGS. 8 and 9 are timing diagrams showing operations of a combination device according to embodiments.

DETAILED DESCRIPTION

Figure 1:
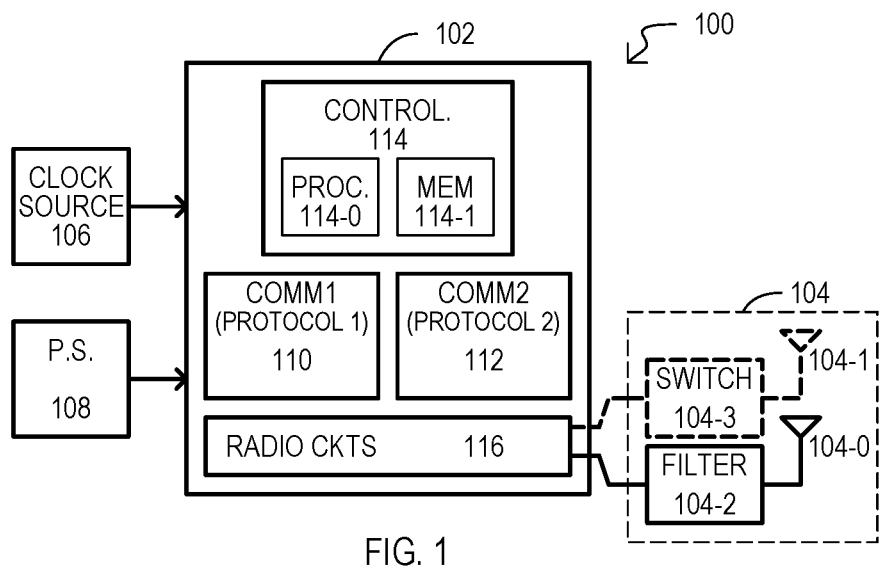
FIG. 1 is a block diagram of a combination device according to an embodiment.

According to embodiments, systems can include collocated communication circuits that share a medium but operate according to different wireless communication protocols. First communication circuits can monitor the medium while it is available for second communication circuits. If first communication circuits detect an appropriate packet, without acknowledging the packet, access to the medium can be requested. Once the first communication circuits have control over the medium, data communications can commence on the medium according to the protocol of the first communication circuits.

In some embodiments first and second communication circuits can be formed on a same integrated circuit device.

In some embodiments first communication circuits can operate according to a first protocol that supports a relatively short range, while second communication circuits can operate according to a protocol that supports a relatively long range.

In the various embodiments below, like items are referred to by the same reference characters, but with the leading digit(s) corresponding to the figure number.

FIG. 1 is a block diagram of a system 100 according to an embodiment. A system 100 can include a combination device 102, antenna section 104, clock source 106, and power supply 108. A combination device 102 can be a device that enables wireless communication over a wireless medium according to a first or second protocol. A medium can be a band of wireless frequencies. A combination device 102 can include first communication circuits 110, second communication circuits 112, a controller 114 and radio circuits 116. In some embodiments, a combination device 102 can be a single integrated circuit device.

First communication circuits 110 can transmit and receive data over a medium according to a first protocol. Second communication circuits 112 can transmit and receive data over the same medium according to a second protocol. In this way, first and second communication circuits (110, 112) provide a combination of wireless communication methods for device 102. According to embodiments, in order to transmit data over the medium, first or second communication circuits must have control over the medium. However, first communication circuits 110 can still detect and/or receive data when the medium is controlled by second communication circuits 112.

A controller 114 can control operations of device 102, including, in some embodiments, dictating which of first or second communication circuits (110,112) controls the medium. In the embodiment shown, a controller 114 can include one or more processors 114-0 and a memory system 114-1. Processor(s) 110 can execute instructions stored in memory system 114-1. In some embodiments, such instructions can be stored in nonvolatile memory of memory system 114-1. Such instructions can configure a device 102 to execute any of the operations, methods, or procedures described herein, or equivalents.

Radio circuits 116 can include circuits for receiving and transmitting signals according to at least two different protocols. Radio circuits can include any suitable circuits according to a selected protocol, and in some embodiments can include physical interface (PHY) circuits and baseband circuits. In some embodiments, radio circuits 116 can transmit/receive on any internationally recognized industrial, scientific, or medical (ISM) band. In some embodiments, radio circuits can 116 can transmit and receive at band around 2.4 GHz, shared by first and second communication circuits (110, 112). In a particular embodiment, radio circuits can 116 can transmit and receive at more than one band. As but one of many possible examples, radio circuits 116 can operate on a first band around 2.4 GHz, shared by first and second communication circuits (110, 112), and a second band around 5.0 GHz used by second communication circuits 112 but not first communication circuits 110. In some embodiments, a 2.4 GHz band can include those frequencies used by the various Bluetooth standards operating in the 2.4 GHz band as well as those frequencies used by the various IEEE 802.11 wireless standards operating in the 2.4 GHz band.

Antenna section 104 can include one or more antennas and associated circuits to enable the transmission and reception of signals in at least one band that is shared between first and second communication circuits (110, 112). In the embodiment shown, antenna section 104 can include a first antenna 104-0 configured to receive and transmit data in a first band shared by first and second communication circuits (110, 112). A filter 104-2 can be disposed between first antenna 104-0 and radio circuits 116 to improve signal quality. A filter 104-2 can be a passive filter, active filter, or some combination thereof.

In some embodiments, antenna section 104 can further include a second antenna 104-1 configured to receive and transmit data in a second band for first communication circuits 110, second communication circuits 112, or both. A switch circuit 104-3 can be disposed between second antenna 104-1 and radio circuits 116 to switch between transmission and reception modes of operation.

In a particular embodiment, first antenna 104-0 can configured to operate in a 2.4 GHz band and can receive and transmit data according to a first protocol (for first communication circuits 110) or a second protocol (for second communication circuits 112). A second antenna 104-1 can configured to operate in a 5 GHz band and can receive and transmit data according to a third protocol for second communication circuits 112 but not first communication circuits 110.

A clock source 106 can provide, or be used to generate, a clock signal for use by combination device 102. In some embodiments, a clock source 106 can include a crystal and various capacitors to enable combination device 102 to generate a clock signal. Alternatively, a clock source 106 can be a clock circuit external to combination device 102. While a clock source 106 can be separate from device 102, in other embodiments a clock source 106 can be part of the device 102. A power supply 108 can provide power to combination device 102. A power supply 108 can include a portable power source (e.g., battery or supercapacitor), a generated power supply, or combination thereof.

Figure 2:
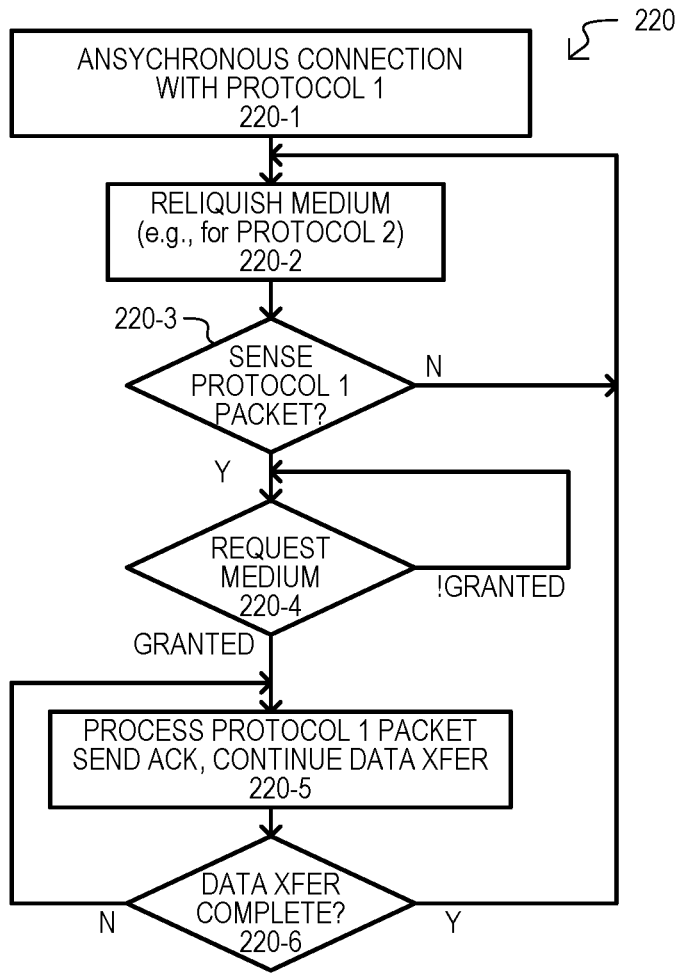
FIG. 2 is a flow diagram of a method according to an embodiment.

FIG. 2 is a flow diagram of method 220 executable by a combination device, such as combination device as disclosed herein, or an equivalent. A method 220 can include establishing an asynchronous connection with a first protocol 220-1. Such an action can include two devices executing an initial operation (e.g., handshake, pairing, etc.) to establish a communication protocol between the two devices. The connection can be asynchronous in that a one device may not know when another device may communicate with it. In some embodiments, such an action can include two devices establishing a hierarchy (e.g., master-slave) so that one device (e.g., slave) will wait to receive data from the other device (e.g., master) in a communication session. In some embodiments, such an action can include a combination device assuming the role of a BT slave in a BT network. In particular embodiments, it can include a combination device operating as a data sink for an asynchronous data connection, such as an advanced audio distribution profile (A2DP) or an asynchronous connectionless communications link (ACL) type connection.

A method 220 can include relinquishing a medium for a second protocol 220-2. Such an action can include a combination device enabling a second communication circuit operating according to a second protocol to have control over a shared medium. In some embodiments such an arrangement can result in the second communication circuit being able to transmit over the medium while the first communication circuits are prevented from such transmissions. Thus, the shared band remains usable by the second communication circuits while the first communication circuits wait for communication from another (e.g., master) device. This increases throughput of the device or system. In particular embodiments, such an action can include a BT portion of a combination device relinquishing control of a 2.4 GHz band to a wireless local area network (WLAN) portion of the combination device. However, in other embodiments, such an action can include a WLAN portion of a combination device relinquishing control of the 2.4 GHz band to a BT portion of the combination device.

A method 220 can also include sensing a first protocol packet 220-3. Such an action can include first communication circuits monitoring the band while it is usable by second communication circuits. In some embodiments, such an action can include first communication circuits detecting at least an initial portion of a packet being transmitted according to the first protocol, such as the preamble and/or initial data following the preamble. From such packet data, a type of packet can be determined. In some embodiments, such action can also include executing an error check operation on the packet. It is noted, however, because the medium is controlled by other communication circuits, the first communication circuits do not reply (e.g., send an acknowledgement) on the shared medium. In particular embodiments, such an action can include a BT portion of a combination device sensing a particular packet type in a master portion of a BT frame, but not send an acknowledgement (ACK) in the corresponding slave portion of the frame. If a first protocol packet is not detected (N from 220-2) a method 220 can continue to relinquish the shared medium to the second communication circuits.

If a first protocol packet is detected (Y from 220-3), a method 220 can request control of the shared medium 220-4. As but a few of many possible examples, such an action can include any of: first communication circuits generating an active interrupt to a controller indicating a particular packet has been received, and the controller can switch control of the shared medium; first communication circuits setting a flag or other indication that can be polled by a controller circuit; or first communication circuits having logic for controlling access to the shared medium. If access is not granted to the shared medium (!GRANTED from 220-4) a method 220 can continue request control of the shared medium.

If control of the medium is granted (GRANTED from 220-4), a method can process packets according to the first protocol 220-5. It is understood that no transmissions according to the second protocol will take place at this time. In particular embodiments, this can include a BT portion of a combination device controlling a 2.4 GHz band, while a corresponding WLAN portion is prevented from transmitting on the band. In addition, a BT portion will return suitable ACKs in a slave portion of frames (220-5).

A method 220 can determine if a current data transfer is complete 220-6. In some embodiments, such an action can be determined by data received from the other (e.g., master) device. If a data transfer is not complete (N from 220-6) a method can return to processing the packets of the current data transfer operation (220-5). If a data transfer is complete (Y from 220-6) a method 220 can once again relinquish the shared band to the second protocol (return to 220-2).

Figure 3:
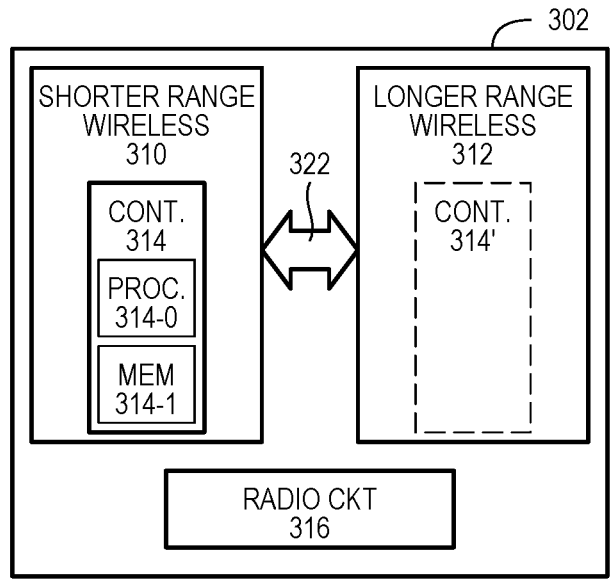
FIG. 3 is a block diagram of a combination device according to another embodiment.

FIG. 3 is a block diagram of a combination device 302 according to another embodiment. In some embodiments, combination device 302 can be one particular implementation of that shown as 102 in FIG. 1. A combination device 302 can include first communication circuits 310 (referred to as "shorter range wireless" in the figure), second communication circuits 312 (referred to as "longer range wireless" in the figure), and radio circuits 316. First communication circuits 310 can be wireless communication circuits compatible with a protocol that can support a first transmission range. Second communication circuits 312 can be wireless communication circuits compatible with a protocol that can support a second transmission range that is greater than the first transmission range. However, both first and second communication circuits can share a medium, and request/relinquish or otherwise acquire control over the shared medium according to any of the embodiments described herein, or equivalents.

Referring still to FIG. 3, a controller 314 can be included in one of the communication circuits and the communication circuits can communicate over a bridge 322. FIG. 3 shows controller 314 located within first communication circuits 310, however, the controller could be located within second communication circuits (shown as controller 314'). Controller 314 can include one or more processors 314-0 and a memory system 314-1. In some embodiments, controller 314/314' can control access to a shared medium according to any of the embodiments described herein, or equivalents.

In particular embodiments, first communication circuits 310 can be a BT portion of combination device 302 and second communication circuits 312 can be a WLAN portion of the combination device 302. Combination device 302 can be formed in a single integrated circuit substrate.

Radio circuits 316 can take the form of any of those described herein or equivalents.

Figure 4:
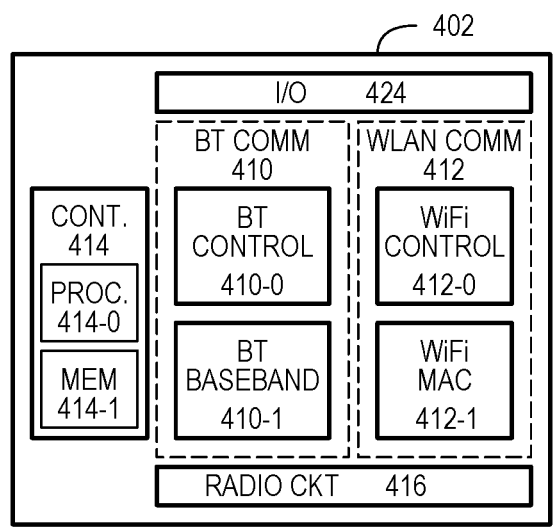
FIG. 4 is a block diagram of a Bluetooth (BT)—wireless local area network (WLAN) combination device according to a further embodiment.

FIG. 4 is a block diagram of a combination device 402 according to another embodiment. In some embodiments, combination device 402 can be one particular implementation of that shown as 102 in FIG. 1. A combination device 402 can include first communication circuits 410, second communication circuits 412, controller 414, radio circuits 416, and input/output (I/O) circuits 424. First communication circuits 410 can be BT circuits including BT control circuits 410-0 and BT baseband circuits 410-1. BT circuits can operate in a 2.4 GHz band. Second communication circuits 412 can be WLAN circuits, including a WiFi control circuit 412-0 and WiFi media access control (MAC) circuits 412-1. WLAN circuits can also operate in a 2.4 GHz band and so can share the band with BT circuits.

In some embodiments, controller 414 can control access to a shared 2.4 GHz band according to any of the embodiments described herein, or equivalents. In the particular embodiment shown, controller 414 can include one or more processors 414-0 and a memory system 414-1.

Radio circuits 416 can take the form of any of those described herein or equivalents.

I/O circuits 424 can enable control of combination device 402 by another system external to the combination device 402. I/O circuits 424 can include circuits that enable communication with the combination device according to any suitable method, including any of various serial data communication standards/methods including but not limited to:

serial digital interface (SDI), universal serial bus (USB), universal asynchronous receiver transmitter (UART), I²C, or I²S.

Figure 5:
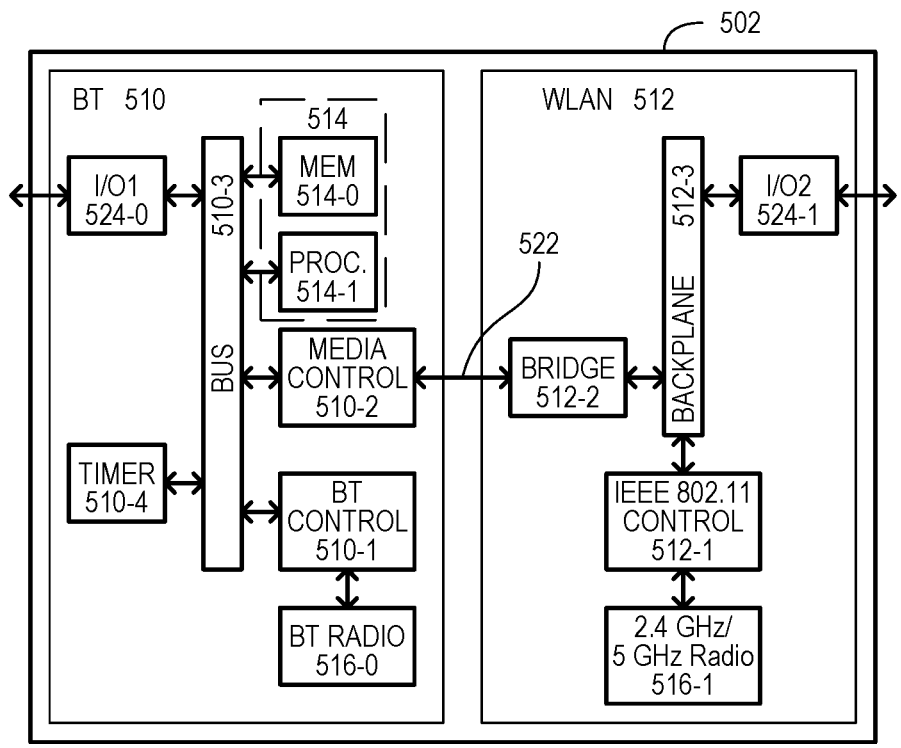
FIG. 5 is a block schematic diagram of a BT—WLAN combination device according to another embodiment.

FIG. 5 is a block diagram of a combination device 502 according to another embodiment. In some embodiments, combination device 502 can be one particular implementation of that shown as 102 in FIG. 1. A combination device 502 can include a BT section 510 and a WLAN section 512. A BT section 510 can include a controller 514, BT control circuits 510-1, media control circuit 510-2, and first I/O circuits 524-0 in communication with one another over a bus 510-3. A controller 514 can control operations of combination device 502, including operations within WLAN section 512. In some embodiments, a controller 514 can issue control signals over bus 510-3 that can be transmitted to WLAN section 512 over bridge 522 via media control circuits 510-2. A controller 514 can include one or more processors 514-0 and a memory system 514-1.

BT control circuits 510-1 can include circuits for performing functions according to one or more BT standards. In some embodiments, BT control circuits 510-1 can detect packets on a shared 2.4 GHz medium, and selectively return ACKs according to whether or not it has control over the shared medium. BT control circuits 510-1 can be connected to BT radio circuits 516-0. BT radio circuits 516-0 can transmit and receive data on a BT band (e.g., between 2.402 and 2.480 GHz).

Media control circuits 510-2 can communicate with WLAN section 512 over bridge 522 to coordinate communications between BT and WLAN sections (510, 512), including signals for controlling which section controls the shared 2.4 GHz medium, as well as data transfers between such sections (510, 512). First I/O circuits 524-0 can enable communication with the combination device 510 according to any of the embodiments described herein or equivalents. Timer circuits 510-4 can provide a timer for operations of a combination device 502, including a watchdog timer as described in embodiments below.

A WLAN section 512 can include IEEE 802.11 control circuit 512-1, bridge control circuit 512-2, and second I/O circuits 524-1 in communication with one another over a backplane 512-3. IEEE 802.11 control circuits 512-1 can include circuits for performing functions according to any IEEE 802.11 wireless or equivalent standard. IEEE 802.11 control circuits 512-1 can be connected to dual band radio circuits 516-1. Dual band radio circuits 516-1 can transmit and receive data on a first WLAN band (e.g., between 2.412 and 2.484 GHz), which can be considered a medium shared with BT section 510. Dual band radio 516-1 can also transmit and receive on a second WLAN band (e.g., 4.915 to 5.865 GHz) which is not shared with BT section 510.

Bridge control circuit 512-2 can control data transfer operations between BT section 510 and WLAN section 512 over bridge 522, including the transfer of control signals or instructions for controlling access to the shared medium. Second I/O circuits 524-1 can enable communication with the combination device 510 according to any of the embodiments described herein or equivalents, including communications with BT section 510 over bridge 522.

Figure 6:
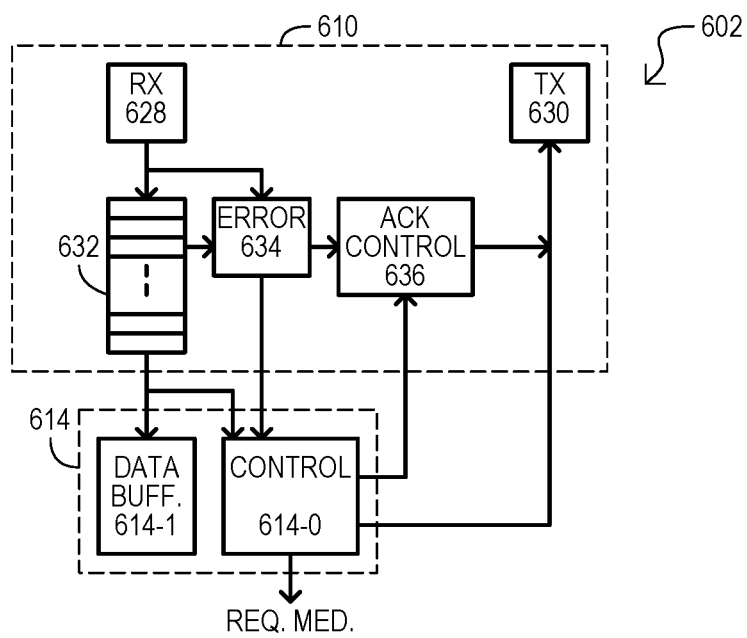
FIG. 6 is a block schematic diagram of a packet processing section of a combination device according to an embodiment.

FIG. 6 shows a portion of combination device 602 according to an embodiment. FIG. 6 shows first communication circuits 610 and a controller 614. First communication circuits 610 can include a packet receive (RX) section 628, a packet transmission (TX) section 630, a packet buffer 632, error check circuit 634, and acknowledge (ACK) control circuit 636. A controller 614 can include control circuits 614-0 and data buffer 614-1. Control circuits 614-0 can include a processor, logic circuits, or combinations thereof.

Various operation of combination device 602 will now be described.

When first communication circuits 610 control a shared medium, packet RX path 628 can receive packets (e.g., from a master device) and store them in packet buffer 632. Error check circuit 634 can perform an error check on the received packet using an error code in the packet. If the packet is considered error-free according to the error check, acknowledgement control circuit 636 can generate an ACK which can be transmitted as a packet via packet TX section 630. Packet data can then be transferred from packet buffer 632 to a data buffer for further processing by control circuits 614-0.

When first communication circuits 610 do not control the shared medium (e.g., the medium has been relinquished to circuits operating according to a different protocol), packet RX section 628 can still receive packets and store them in packet buffer 632. Error check circuit 634 can perform an error check on the received packet using an error code in the packet (e.g., CRC). However, if the packet is considered error-free, acknowledgement control circuit 636 does not generate an ACK. Control circuits 614-0 can determine if the packet is of a predetermined type (e.g., part of an asynchronous data transmission). If a packet is one of the predetermined types, control circuits 614-0 can request control of the shared medium (REQ. MED). Once first communication circuits have control of the medium, operations can occur as noted above.

Figure 7:
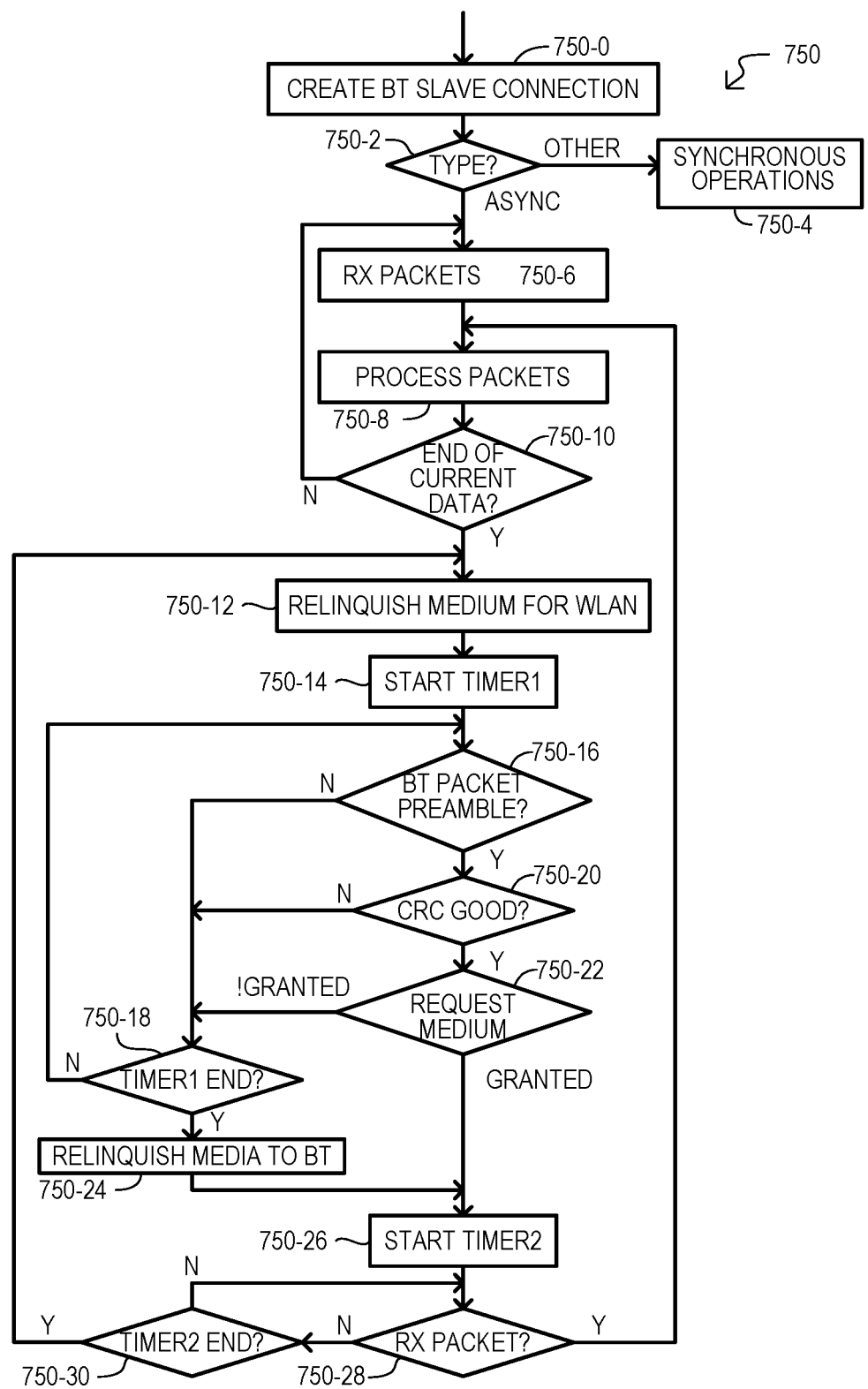
FIG. 7 is a flow diagram of a method according to another embodiment.

FIG. 7 is a flow diagram of method 750 executable by a combination device as disclosed herein, or equivalents. A method 750 assumes within a combination device, a BT section has control over a shared medium. Method 750 can include creating a BT connection 750-0. Such an action can include a combination device communicating via a BT protocol to establish itself as a BT slave device. A method 750 can determine if the connection is according to any of a number of asynchronous protocols 750-2. Such an action can include decoding packet data received from a BT master device. If the connection is not for an asynchronous protocol (OTHER from 750-2), a method can proceed to synchronous connection operations 750-4.

If the connection is for an appropriate asynchronous protocol (ASYNC from 750-2), a method can receive the packets 750-6 and process the packets 750-8. In some embodiments, such processing can occur according to conventional BT techniques.

A method 750 can then determine if data for the current transmission has ended 750-10. Such an action can include making such a determination from packet data received (e.g., the protocol provides the indication) or can include the failure to receive data from a BT master device within a certain time period, as but two of many possible examples. If current data is determined not to have ended (N from 750-10), a method can continue receiving and processing packets.

If current data is determined to have ended (Y from 750-10), a method 750 can relinquish the shared medium to a WLAN section 750-12. Such an action can include enabling a WLAN section to transmit data over the shared medium and preventing a BT section from transmitting over the shared medium.

Once the medium has been yielded to a WLANs section, a method 750 can start a first timer 750-14. A first timer 750-14 can be watchdog timer that can interrupt WLAN control in the event BT packets have not been sensed within a watchdog time period. Such a timer can be configurable. In particular embodiments, such a timer can be set to about 10-100 ms, or about 20-60 ms, or about 40 ms.

A method 750 can monitor the shared medium to detect a BT packet preamble 750-16. Such an action can include BT circuits monitoring the shared medium for one or more predetermined packet preambles that indicate a BT packet of interest. If no such preamble is detected (N from 750-16), a method 750 can check the first timer 750-18. If the first timer is not expired (N from 750-18), a method can return to checking for a BT preamble 750-16.

In the embodiment shown, if a BT preamble of interest is detected, the packet can be buffered, and an error check operation performed on the packet (750-20) to verify it is a packet of interest. If the error check indicates the packet contains an error and/or is not of interest (N from 750-20) the first timer can be checked (go to 750-18).

If an error check indicates the packet is of interest (Y from 750-20), a request for control of the medium can be requested (750-22). If control of the medium is not granted (!GRANTED from 750-22), the first timer can be checked (go to 750-18).

If a first timer expires (Y from 750-18), the shared media can be relinquished to the BT section 750-24 (i.e., BT control is forced).

If control of the medium is granted (GRANTED from 750-22) or BT control is forced (750-24), a method 750 can prepare to process another set of BT packets. In the embodiment shown, such an action can include starting a second timer (750-26) and determining if more BT packets are received (750-28). If such packets are not received (N from 750-28), a method 750 can check the second timer 750-30. If the second timer has not expired (N from 750-30), a method can continue to await BT packets (return to 750-28).

If the second timer expires (Y from 750-30), the shared media can be relinquished to the WLAN section (go to 750-12), and method 750 can return to sensing BT packets while the WLAN section has control over medium.

If BT packets are received (Y from 750-28), a method 750 can process such packets as noted above (go to 750-8). Once the processing of such packets has ended, the medium can be relinquished to the WLAN.

FIG. 8 is a timing diagram showing operations of a combination device according to embodiments. FIG. 8 shows how a BT portion can monitor a shared medium, while it is controlled by a WLAN portion, and request (and take) control of the medium when a BT packet is detected. FIG. 8 shows activity of a BT master, a BT slave, a WLAN portion, as well as a medium shared between the BT slave and WLAN portion. It is understood that BT slave and WLAN portion are formed in a same combination device, and a BT master is on a different device, and can wirelessly communication with the BT slave. A combination device can take the form of any of those described herein, or equivalents.

At 852-0, the BT master can start a connection with the BT slave. At this time there is no contention for the medium by WLAN portion, so the medium is controlled by the BT slave. A BT master can transmit data in master portions of frames, and BT slave can acknowledge (and send data if needed) in slave portions of the frames. At 852-2, in response to a master not currently sending data (but more data is expected), a BT slave can relinquish the medium to a WLAN portion, rather than maintain control over the medium in the expectation of asynchronous data. Consequently, a WLAN portion can have control of the medium, unlike conventional approaches.

At 852-4, a BT slave can sense a BT packet from a BT master, and in response, request control of the medium. Such actions can include any of those described herein, or equivalents. Notably, BT slave does not generate an ACK in the slave portion of the frame for the detected BT packet.

At 852-6, the medium is granted to the BT portion, and the BT master and BT slave can exchange data in their respective portions of sequential frames. At 852-8, data from the master can stop, and BT portion can again relinquish the medium to WLAN portion.

At 852-10, a BT slave can again sense a BT packet from a BT master, and in response, request control of the medium. However, the medium is not granted for three BT frames.

At 852-12, the medium is granted to the BT portion, and the BT master and BT slave can exchange data once again.

At 852-14, a BT connection can end with BT master, and the medium can again be relinquished to the WLAN portion.

FIG. 9 is a timing diagram showing additional operations of a combination device according to embodiments. FIG. 9 shows how a BT portion can force control over a shared medium from a WLAN if expected BT packets are not received within a watchdog timer period. FIG. 9 shows the same waveforms as FIG. 8.

At 954-0, the BT master can start a connection with the BT slave. Such actions can include those noted in FIG. 8.

At 954-2, in response to a master not currently sending data, a BT slave can relinquish the medium to a WLAN portion. Such actions can include those noted in FIG. 8. Also at about this time, a watchdog time can start.

At 954-4, a BT slave can attempt to sense BT packets from a master but fail to do so. Failure to sense the BT packets can occur for any of various reasons, but can often occur in cases where a BT master is at a relatively large distance from the combination device, resulting in WLAN signals corrupting signals from the BT master.

At 954-6, a watchdog timer can expire, and the medium can be given to a BT slave.

At 954-8, now in control of the medium, a BT slave can receive and process BT packets from a BT master.

Figure 10:
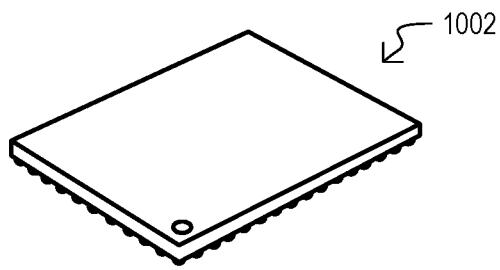
FIG. 10 is a diagram showing a combination device according to another embodiment.

While embodiments can include systems with various interconnected components, embodiments can include unitary devices which can vary control over a shared transmission medium to increase data throughput as described herein, and equivalents. In some embodiments, such unitary devices can be advantageously compact single integrated circuits (i.e., chips). FIG. 10 show one particular example of a packaged single chip combination device 1002. However, it is understood that a combination device according to embodiments can include any other suitable integrated circuit packaging type, as well as direct bonding of a combination device chip onto a circuit board or substrate.

Figure 11A:
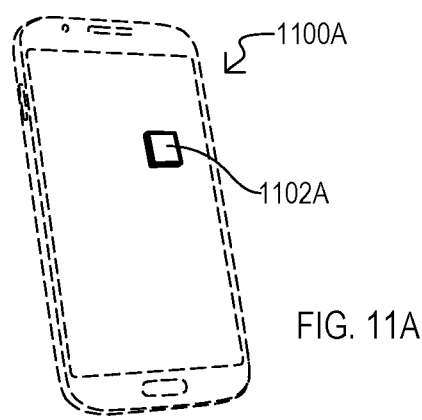
FIGS. 11A to 11D are diagrams of systems according to various embodiments.

Referring to FIGS. 11A to 11D, various systems according to embodiments are shown in series of diagrams. FIG. 11A shows a handheld computing device 1100A. Handheld computing device 1100A can include a combination device 1102A that can provide multiple protocols over a shared medium with higher throughput as described herein, or equivalents.

Figure 11B:
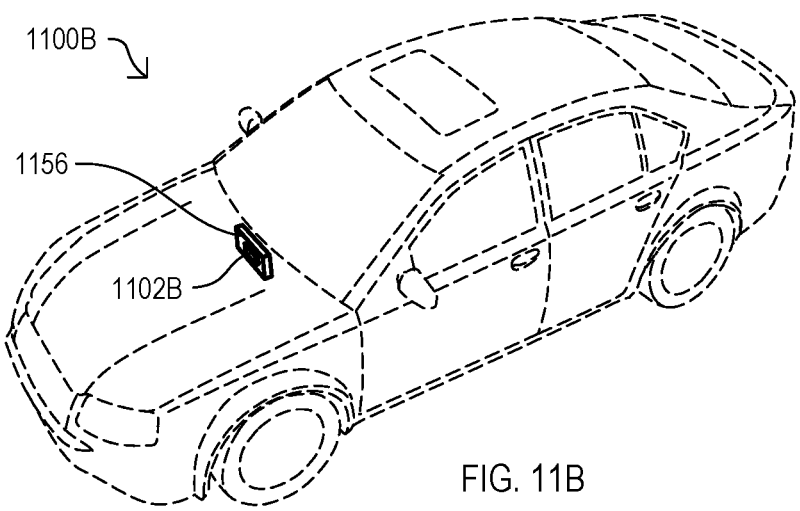

FIG. 11B shows an automobile 1100B that can have numerous sub-systems, including a communication subsystem 1156. In some embodiments, a communication system 1156 can enable an automobile to provide WiFi communications as well as enable other devices to pair to the system via Bluetooth. Communication system 1156 can include a combination device 1102B as described herein, or equivalents, to provide greater throughput for WiFi communications.

Figure 11C:
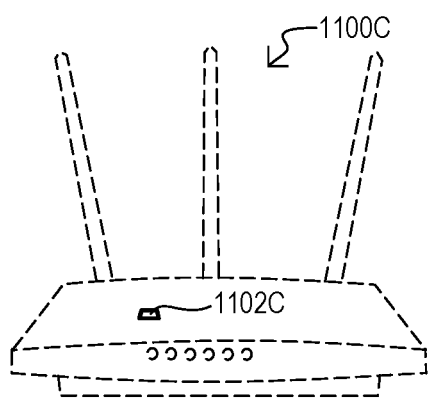

FIG. 11C shows a router device 1100C. Router device 1100C can provide routing functions for a relatively large range protocol (e.g., WLAN) while also enabling access via a closer range protocol (e.g., Bluetooth). Router device 1100C can include a combination device 1102C as described herein, or equivalents.

Figure 11D:
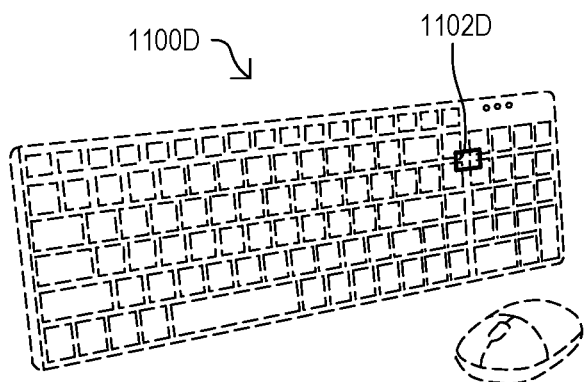
Figure 12:
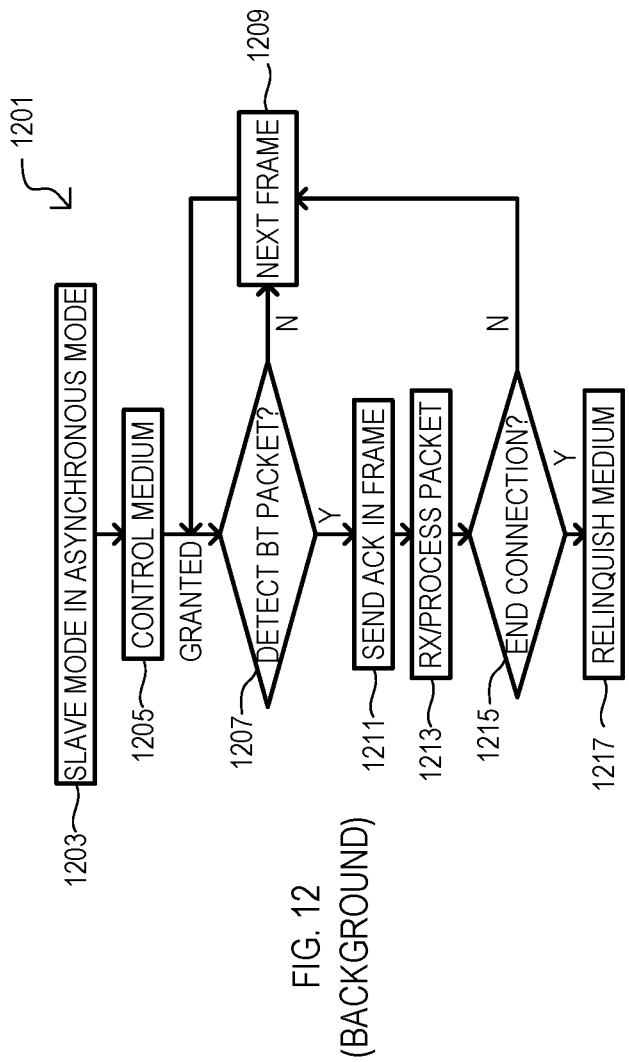
FIG. 12 shows a conventional method for a BT—WLAN combination device.
Figure 13:
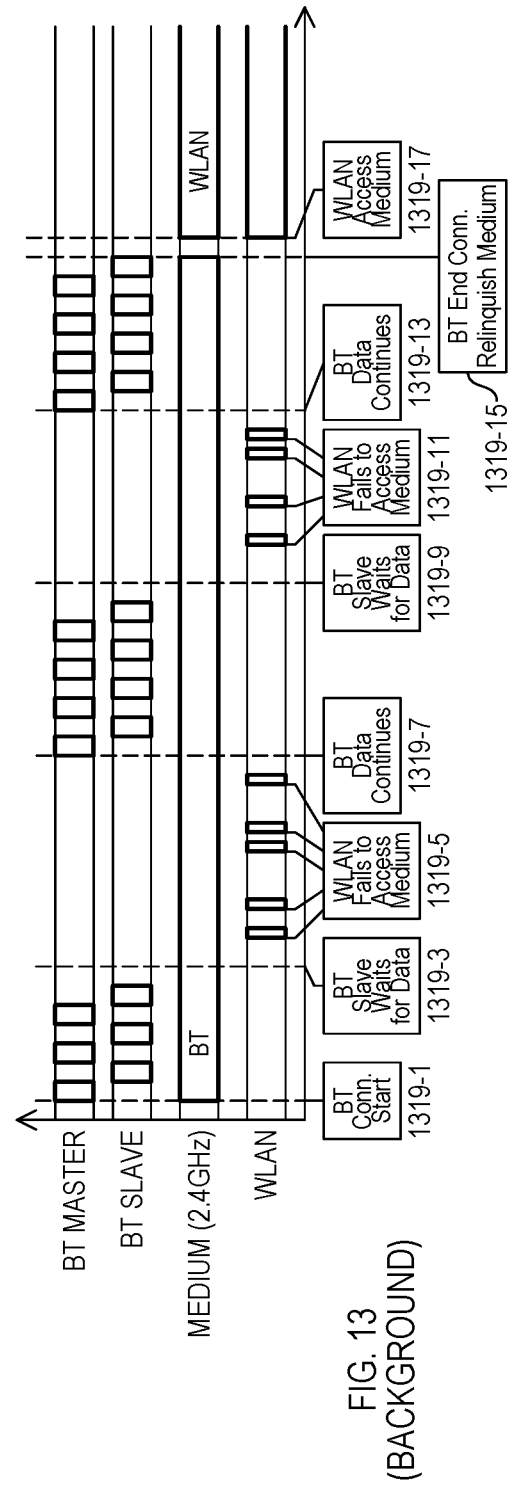
FIG. 13 is a timing diagram showing operations of a conventional a BT—WLAN combination device.

FIG. 11D shows a human interface device 1100D. Human interface device 1100D can enable a person to interact or control other devices. As but a few of many possible examples, human interface device 1100D can control a computing system, manufacturing equipment or other systems. Human interface device 1100D can include a combination device 1102D as described herein, or equivalents.

Embodiments described herein are in contrast to conventional combination devices in which BT portions can maintain control of a medium while waiting for asynchronous data, thus preventing a WLAN portion from using the medium. According to embodiments, higher throughput for a WLAN portion can be achieved by yielding the medium to a WLAN portion while a BT portion monitors the medium for asynchronous data, taking control of the medium when asynchronous data is detected.

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   monitoring a wireless transmission medium for packets of a first protocol type with first communication circuits of a device while yielding the medium for communications of a second protocol type by second communication circuits of the device, wherein the medium comprises a range of frequencies at least a portion of which is used by the first protocol type and the second protocol type;
   responsive to the first communication circuits detecting a packet of the first protocol type while the medium is yielded to the second communication circuits, requesting access to the medium for the first communication circuits;
   upon being granted access to the medium, using the first communication circuits executing a data transmission operation according to the first protocol type; and
   responsive to completing the data transmission operation by the first communication circuits, yielding the medium back to the second communication circuits.

2. The method of claim 1, wherein the first protocol type includes time periods in which data may be received by and transmitted from the device, wherein the monitoring of the medium for packets of the first protocol type includes monitoring at least a portion of the time periods in which data may be received.

3. The method of claim 1, wherein the monitoring of the medium for the packets of the first protocol type includes detecting at least a predetermined preamble of a packet.

4. The method of claim 1, wherein the monitoring of the medium for the packets of the first protocol type includes performing an error check operation on at least one packet with an error code received with the at least one packet.

5. The method of claim 1, wherein the medium includes frequencies in a range of about 2.40 GHz to about 2.50 GHz.

6. The method of claim 1, wherein the first protocol type includes at least one Bluetooth protocol and the second protocol type includes at least one IEEE 802.11 wireless standard, and wherein the first and second communications circuits are formed in a substrate of a same integrated circuit device.

7. The method of claim 1, further comprising responsive to the first communication circuits not detecting a packet of the first protocol type for a predetermined time period while the medium is yielded to the second communication circuits yielding the medium to the first communication circuits.

8. A device, comprising:
   first communication circuits configured to receive and transmit packets over a medium according to a first protocol;
   second communication circuits configured to receive and transmit packets over the medium according to a second protocol;
   a controller circuit configured to control access to the medium by the first or second communication circuits, wherein the first communication circuits are further configured to monitor the medium for packets of the first protocol while the second communication circuits control the medium, request control of access to the medium in response to detection of a packet of the first protocol while the second communication circuits control the medium, transfer data according to the first protocol when granted control of the medium, and yield control of access to the medium to the second communication circuits upon completion of the transfer of data.

9. The device of claim 8, wherein the first protocol supports a first transmission range and the second protocol supports a second transmission range that is greater than the first transmission range.

10. The device of claim 8, wherein the first communication circuits comprise a baseband circuit and a first radio circuit that operate according to at least one Bluetooth standard and the second communication circuits comprise a media access control circuit and a second radio circuit that operate according to at least one IEEE 802.11 wireless standard.

11. The device of claim 8, wherein the first communication circuits are configured to detect a packet of the first protocol by inspecting at least a preamble of a received packet.

12. The device of claim 11, wherein the first communication circuits are configured to detect the packet of the first protocol by executing an error check operation on the packet using an error code received with the packet.

13. The device of claim 8, wherein the first communication circuits are configured to monitor time periods for packets of the first protocol while the second communication circuits control the medium, wherein responsive to the detection of the packet of the first protocol type, the first communication circuits are configured to request control of the medium, and responsive to being granted control of the medium, send at least an acknowledgement packet over the medium in response to receiving another packet of the first protocol.

14. The device of claim 8, wherein the first communication circuits, second communication circuits, and the controller circuit are formed in a same integrated circuit substrate.

15. A system, comprising:
controller circuits configured to control access to a medium;
first communication circuits configured to receive packets over the medium, and to refrain from transmitting packets over the medium unless granted access to the medium; and
second communication circuits configured to receive packets over the medium, and to refrain from transmitting packets over the medium unless granted access to the medium; wherein
the first communication circuits are further configured to: monitor the medium for packets of a first protocol type while the second communication circuits control access to the medium, request control of access to the medium in response to detection of a packet of the first protocol type, execute data transfer according to the first protocol type when granted control of access to the medium, and yield control of access to the medium to the second communication circuits upon completing the data transfer.

16. The system of claim 15, wherein the controller circuits include at least one processor circuit and memory for storing instructions executable by the at least one processor.

17. The system of claim 15, wherein the first communication circuits are configured to execute communications according to at least one Bluetooth standard; and the second communication circuits are configured to execute communications according to at least one of IEEE 802.11 wireless standard.

18. The system of claim 15, further including at least a first antenna configured to transmit and receive via the medium.

19. The system of claim 18, further including a second antenna configured to transmit and receive via another medium that does not overlap the medium.

20. The system of claim 15, further including input/output circuits configured to enable serial communications to control the first and second communication circuits.

\* \* \* \* \*